G. T. TWINTING.
CAMERA OPERATING DEVICE.
APPLICATION FILED FEB. 16, 1916.
1,216,021.
Patented Feb. 13, 1917.
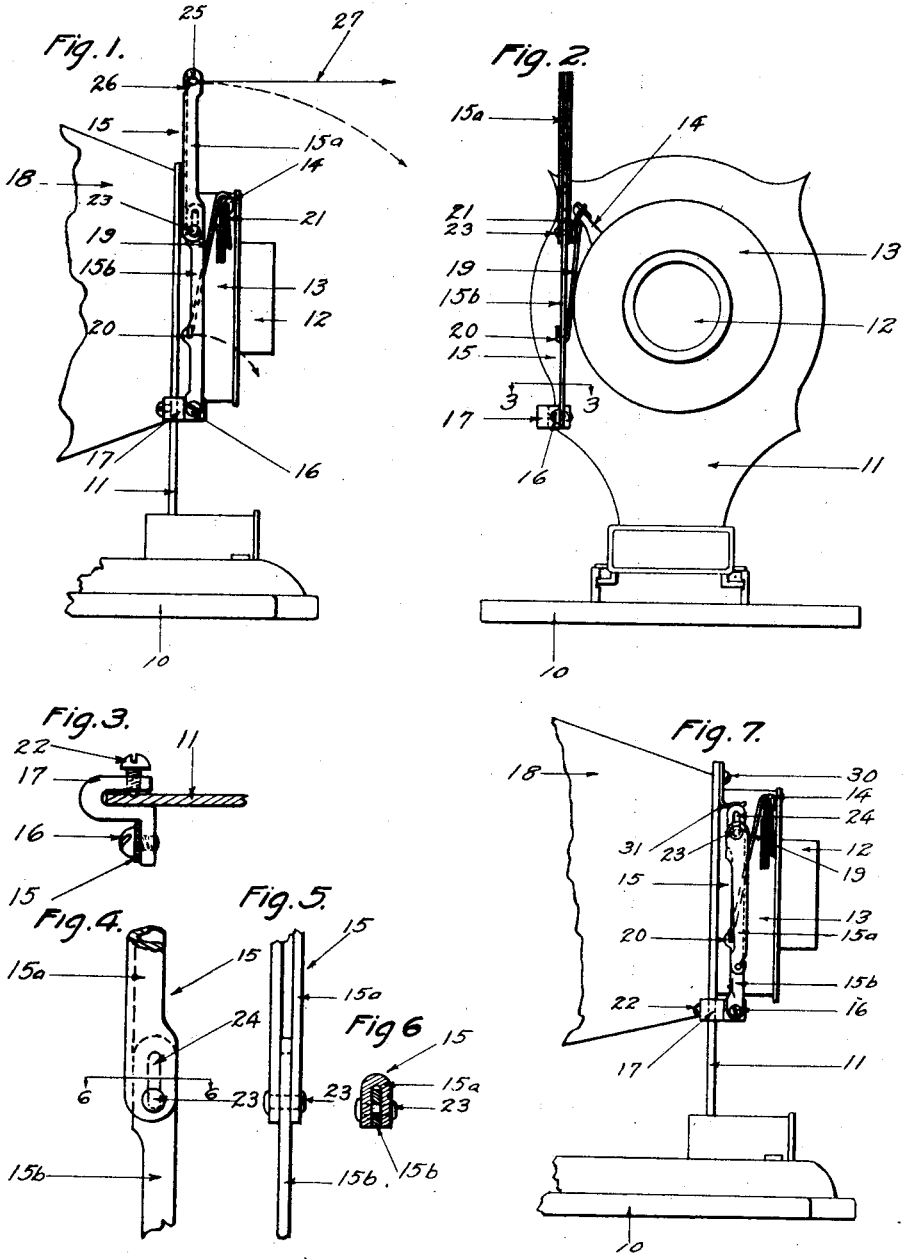
WITNESS
George T. Twinting INVENTOR

UNITED STATES PATENT OFFICE.

GEORGE T. TWINTING, OF PASADENA, CALIFORNIA.

CAMERA-OPERATING DEVICE.

1,216,021. Specification of Letters Patent. Patented Feb. 13, 1917.

Application filed February 16, 1916. Serial No. 78,587.

*To all whom it may concern:*

Be it known that I, GEORGE T. TWINTING, a citizen of the United States, residing at Pasadena, in the county of Los Angeles, State of California, have invented new and useful Improvements in Camera-Operating Devices, of which the following is a specification.

This invention relates to devices for operating a camera at a distance; and it is a primary object of this invention to provide a simple, reliable, efficient and neat mechanical device capable of adaptation and attachment to different styles of cameras. And it is an object of this invention to provide an operating device which does not necessitate the camera being specially mounted but which will allow the camera to be placed upon any convenient support without being specially secured against movement.

The further objects of my invention will be made apparent from the following description of a preferred embodiment of my invention, reference being had to the accompanying drawings in which Figure 1 is a side elevation showing my improved device in operative position upon a camera, Fig. 2 is a front elevation showing the same, Fig. 3 is a section taken as indicated by line 3—3 on Fig. 2, Figs. 4 and 5 are details illustrating a preferred form of joint which I use in the operating lever of my device, Fig. 6 is a detail section taken as indicated by line 6—6 on Fig. 4; and Fig. 7 is a side elevation showing my device folded to its position assumed when out of use.

In the drawings I have shown the forward parts of a typical camera, including the base or front board 10, the front standard 11 on shutter board which usually is slidable upon the base board 10 and usually made in the form of a plate, the lens 12 and shutter box 13 supported upon the standard 11, and the front part of the bellows 18 connecting with the standard 11. It will be understood that my device is adaptable to any ordinary form of camera having a mechanical operating means such as to be described. In the typical form of camera there is a small shutter actuating lever 14, the downward movement of which causes operation of the shutter. It is a specific object of this invention to provide a simple mechanical means for causing the movement of the actuating lever 14.

I employ a lever 15 whose lower end is pivoted at 16 on a suitable supporting means; and in the case illustrated, I preferably mount the pivot 16 upon a small clamp 17 which is secured to the standard 11 in the manner shown in the drawings. This manner of mounting the pivot 16 may be varied to suit different styles of cameras, but the device shown and described herein may be mounted upon many different makes of cameras without material change. The lever 15 normally stands in a vertical position above the lower pivot 16, being normally held in that position by the spring or other means which throws the actuating lever 14 back to its normal upper position. (It is to be noted that, for illustrative purposes, I have shown the lever 14 farther forward in relation to the lever 17 than is usually the case. In the actual construction the pull on link 19 is on nearly a vertical line, so that the lever 17 is pulled back to, or nearly to, a vertical position.) A connecting link 19 preferably made of wire bent in the shape illustrated, is connected at 20 with the lever 15 at a short distance above the pivot 16, and has at its upper end a hook portion 21 which is passed through a small hole usually present in or drilled through the actuating lever 14. The shape of this hook portion is clearly shown in Figs. 1 and 2, being preferably straight in the aspect shown in Fig. 1 and curved in the aspect shown in Fig. 2, so as to conform more or less closely to the curved line of movement of the outer end of the actuating lever 14. The hook passes loosely through the lever 14 so that the lever may move freely independently of my operating mechanism when the camera shutter is actuated by other means (such as the compressed air actuated means usually supplied on such cameras). The upper end of the lever 15 is provided with an eye 25 having a slot 26 leading thereto, so that a loop in the end of a thread 27 may be easily slipped into the eye. The total length of lever 15 is great as compared with the distance between the points 16 and 20; so that a comparatively great leverage is set up and the forward horizontal pull on the thread 27 need not be very great. All the parts are light and easily actuated; and the only resistance to overcome is the resistance opposed by the spring or other means to the movement of the actuating lever 14; so that the pull necessary on the thread 27 is very slight.

It is more or less immaterial whether the pivotal point 16 be mounted relatively high or low upon the camera; but I prefer to mount in about the position shown in the drawings, in which case the upper end of the lever 15 normally projects above the top of the plate 11. For the purpose of lowering the upper end of lever 15 to a point below the upper edge of the plate 11, I make the lever 15 in two parts, the upper part to fold upon the lower part. I provide a preferred form of joint as shown in detail in Figs. 4, 5 and 6. The upper part 15$^a$ is provided with a pin 23 movable in a vertical slot 24 in the lower part 15$^b$. The upper part 15$^a$ is made in channel shape to fit around and behind the lower part 15$^b$ when the pin 23 is moved to the lower part of slot 24; and in this position the upper part can not be bent forwardly on the lower part of the lever. But when the upper part 15$^a$ is raised so that the pin 23 occupies the upper part of slot 24, then the upper part 15$^a$ may be usually swung forwardly and downwardly and then rearwardly so as to lie against and around the lower part 15$^b$. This condition of the device when not in use is shown in Fig. 7.

Also, in Fig. 7, I show a small spring clip 31 secured at 30 to the plate 11, adapted to engage over the upper end of the lower part 15$^b$ of lever 15, to hold the lever in vertical position back against or near the plate 11 and to prevent the lever dropping forwardly, as it may sometimes do when the shutter is actuated by other means and the lever 14 moves down.

When desired to be used, the device is put in the position shown in Figs. 1 and 2 and a suitable thread or other member is attached as described. The camera is then placed in position as desired and a person in the field of view may then pull the thread 27 and operate the camera shutter. As hereinbefore stated, the pull necessary on thread 27 is very slight; so that the camera may be merely laid on any convenient support without having to be fastened down in any manner whatsoever. When not in use my device does not interfere at all with the ordinary use of the camera, the actuating lever 14 being capable of moving independently of my operating mechanism, and my device being entirely out of the way, fitting snugly against the shutter board (plate 11) and the shutter box.

Having described a preferred form of my invention I claim:

1. In combination with a camera having an actuating lever, an operating mechanism therefor embodying an operating lever pivoted at one end upon the camera, means at the other end of the lever for attaching a pull thread or the like, and a connecting link connecting directly between the lever at a point near its pivotal point and the actuating lever of the camera, said actuating lever having an aperture therethrough, and there being a hook upon the end of the connecting link hooking loosely through said aperture, so that the actuating lever may move independently of the connection link.

2. In combination with a camera having an actuating lever, an operating mechanism therefor embodying an operating lever pivoted at one end upon the camera, means at the other end of the lever for attaching a pull thread or the like, and a connecting link connecting directly between the lever at a point near its pivotal point and the actuating lever of the camera, said actuating lever having an aperture therethrough and there being a hook upon the end of the connecting link hooking loosely through said aperture so that the actuating lever may move independently of the connecting link, said operating lever being composed of two parts, and a joint between the two parts of the operating lever allowing the upper of said parts to fold on the lower of said parts.

3. In combination with a camera of the class described having a downwardly movable actuating lever, a vertical operating lever pivoted at its lower end to the camera, means at the upper end of the lever for attaching a pull thread or the like, and a connecting link connecting between the operating lever at a point near its pivotal mounting and the actuating lever of the camera, said operating lever being composed of two parts, and a joint between the two parts of the operating lever allowing the upper of said parts to fold upon the lower of said parts.

4. In combination with a camera of the class described, a vertical operating lever pivoted at one end to the camera so as to be movable longitudinally forwardly on the camera, connecting means between said lever and the actuating lever of the camera, and said operating lever being composed of two parts, with a joint between the two parts allowing one of said parts to fold upon the other.

5. In combination with a camera having an actuating lever, an operating mechanism therefor embodying an operating lever pivoted at one end upon the camera, means at the other end of the lever for attaching a pull thread or the like, and a connecting link connecting between the lever at a point near its pivot and the actuating lever of the camera, said connecting link being provided with means allowing the free independent movement of the actuating lever.

In witness that I claim the foregoing I have hereunto subscribed my name this 19th day of January, 1916.

GEORGE T. TWINTING.

Copies of this patent may be obtained for five cents each, by addressing the "Commissioner of Patents, Washington, D. C."